United States Patent [19]
McElroy

[11] 4,085,904
[45] Apr. 25, 1978

[54] PORTABLE CABLE REEL DRIVE

[75] Inventor: James A. McElroy, 951 Spanish Cir., Delray Beach, Fla. 33444

[73] Assignee: James A. McElroy, Delray Beach, Fla.

[21] Appl. No.: 657,229

[22] Filed: Feb. 11, 1976

Related U.S. Application Data

[63] Continuation-in-part of Ser. No. 542,550, Jan. 20, 1975, abandoned.

[51] Int. Cl.² ............... B65H 49/00; B65H 75/00
[52] U.S. Cl. .................................. 242/54 R
[58] Field of Search ............ 242/54 R, 65, 66, 68.7, 242/75.1, 78.7, 55; 254/186 R, 175.5, 187.1, 185 R

[56] References Cited

U.S. PATENT DOCUMENTS

| | | | |
|---|---|---|---|
| 2,679,987 | 6/1954 | Saliba | 242/66 |
| 2,904,273 | 9/1959 | Turner et al. | 242/66 X |
| 3,048,870 | 8/1962 | Criscuolo | 242/65 X |
| 3,198,449 | 8/1965 | Scher | 242/66 X |

Primary Examiner—Harvey C. Hornsby
Assistant Examiner—John M. Jillions
Attorney, Agent, or Firm—Malin & Haley

[57] ABSTRACT

A portable cable reel drive device which is removeably and adjustably attachable to large reels of varying widths and diameters having heavy metal cable or the like. The device includes a portable drive shaft having an adjustable reel hub engaging means, a hanger assembly for mounting and coupling the device to the reel itself, a shaft supporting device for supporting the shaft above ground and a tie down means for connecting and holding the shaft in place when it is being driven. The device is driven by a conventional, portable electric motor which is attachable to one end of the reel drive shaft. The device is especially useful for paying out heavy electrical cable on large reels to reduce the number of men required during the operation.

3 Claims, 4 Drawing Figures

U.S. Patent
April 25, 1978
4,085,904
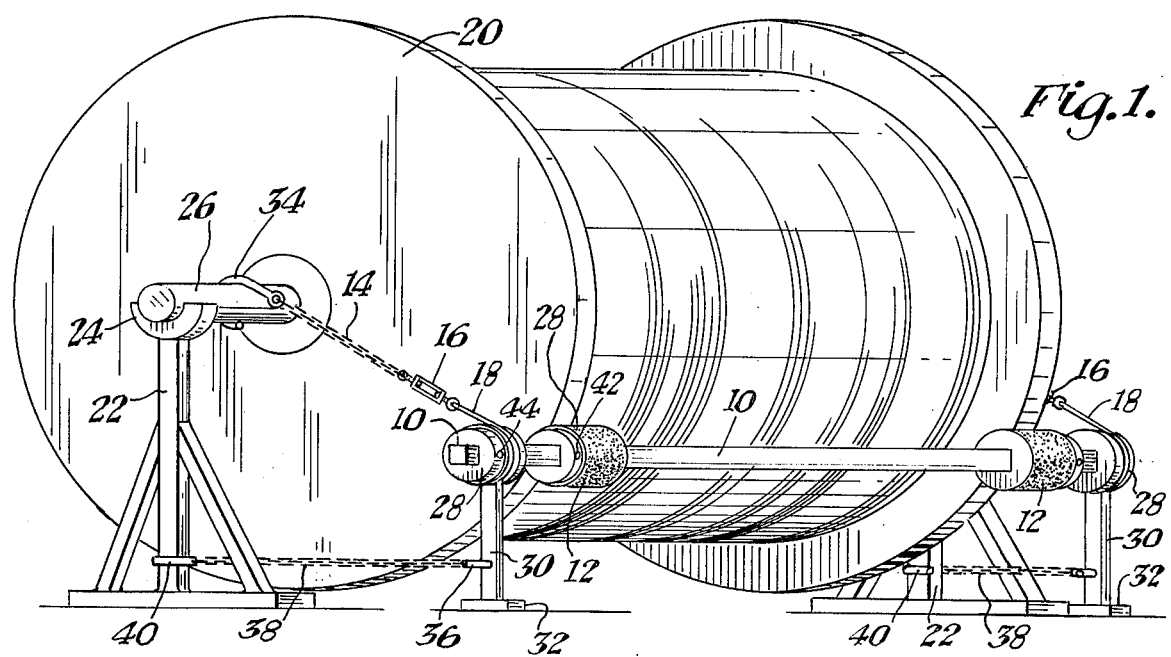
Fig.1.
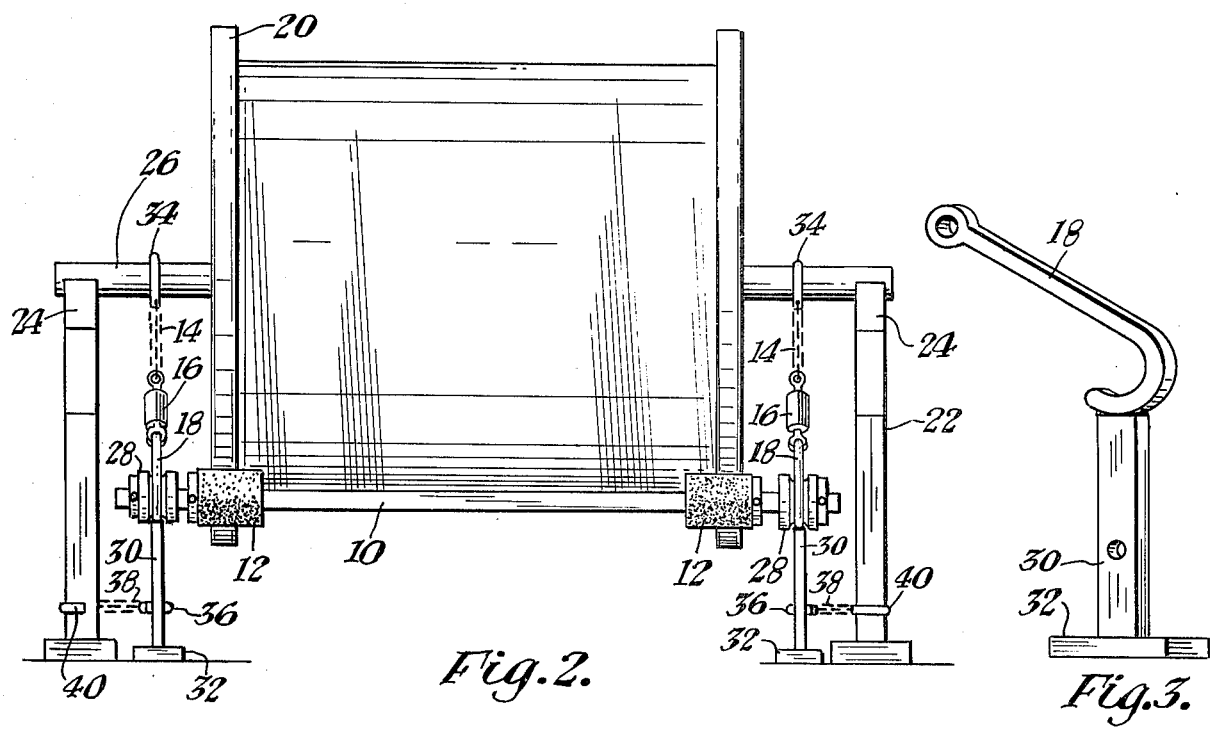
Fig.2.
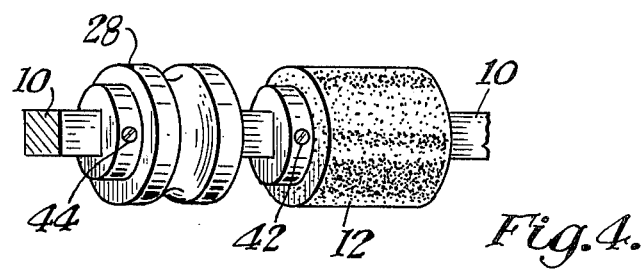
Fig.3.
Fig.4.

PORTABLE CABLE REEL DRIVE

This application is a continuation-in-part of Applicant's prior patent application Ser. No. 542,550, filed Jan. 20, 1975, now abandoned entitled PORTABLE CABLE REEL DRIVE.

BACKGROUND OF THE INVENTION

This invention relates generally to a devide for driving a reel containing cable, conduit or the like, and more specifically to a portable reel driving device which is removeably mounted on a reel and allows for the reel to be either driven in one of two directions to pay out or pull in the cable attached about the reel itself.

In the past in laying heavy wire, such as electrical cable, it has been common to employ at least two or three men to aid in paying out the cable during the operation due to the large momentum of the reel containing the heavy electrical cable. It has been found that when employing several men oftentimes the cable is payed out at varying speeds resulting in a slow down of the operation. However, due to the fact that many times a cable is laid in remote areas, it is impractical to employ large permanently mounted reel drives. The instant invention overcomes these problems by providing a portable reel drive unit which may be easily engaged or disengaged to any size diameter or width reel including large cable reels and may be utilized with a conventional electric hand-held unit to accomplish the cable payout or reel in. The device also insures a constant speed payout of the cable and is adjustable for virtually any size reel, both as to the width and diameter.

BRIEF DESCRIPTION OF THE INVENTION

A portable cable reel drive unit attachable to a cable reel comprising a drive shaft and a pair of reel drive hubs which are adjustably mounted on the drive shaft for positioning along the longitudinal axis of the drive shaft to accommodate reels of varying widths such that each drive hub engages the reel on each side. The shaft is stabilized by a tie-down and a shaft support which prevent relative movement of the shaft around the reel hub. The device includes a reel axle connecting means for connecting the drive shaft of the device with the axle of the reel to be driven to engage and hold the shaft on each side of the reel. In one embodiment this includes a flexible chain and turnbuckle with connecting hooks at each end for engaging the reel axle and a slip ring connected to the drive shaft itself. The hook which engages the slip ring on the drive shaft on each side also includes a supporting stand welded thereto. An adjustable tie-down is connected between the supporting stand and the jack which supports the reel. The supporting stand and the tie-down connector prevent the shaft and reel-drive hubs (when rotated) from riding circumferentially around the rim of the reel.

The reel-drive hubs are adjustable along the drive shaft length for adjustment purposes and may be locked in position by set screws or other conventional fasteners. The hook engaging slip ring mounted in the drive shaft is likewise slideably adjustable along the length and is locked in position by set screws. The reel drive hubs include a non-slip type material such as neopreme rubber to increase the frictional contact with the edges of the reel.

In operation, the device is installed by positioning the reel-drive hubs on the drive shaft into contact with the circumferential edges of the reel hub (and the reel-drive hubs are slideably positioned along the shaft to accommodate the particular reel width). The hanger assemblies (chain, hooks and turnbuckles) are connected between the reel axle and the slide ring on each side of the reel. The turnbuckle allows the hanger assembly to be adjusted so that the reeldrive hubs firmly engage the reel hub edges. The slip ring support shafts are placed on the ground near the reel. The tie-downs are connected between the reel jack housing and the slip ring support shafts.

A portable hand-held electrical motor is coupled at one end of the drive shaft to supply rotational energy to the drive shaft. The device may be utilized to either payout or wrap any type of cable, but, in the preferred embodiment, is used as a payout reel drive in laying large heavy weight electrical cable. The device is particularly useful in paying out electrical cable on reels as large as five tons.

It is object of this invention to provide an improved device for paying out or driving reels containing a flexible cable or the like.

It is another object of this invention to provide a portable reel drive unit which may be easily attached to a conventional cable reel and utilized to payout heavy weight electrical cable or the like at an onsight job location.

And yet still another object of this invention is to provide a portable reel drive unit which may be operated by one person to accomplish paying out of heavy weight cable from a reel.

In accordance with these and other objects which will be apparent hereinafter, the instant invention will now be described with particular reference to the accompanying drawings.

BRIEF DESCRIPTION OF THE DRAWINGS

FIG. 1 shows a perspective view of a conventional reel with the instant invention attached thereto in an operating position.

FIG. 2 shows a front elevational view of the instant invention of the embodiment shown in FIG. 1.

FIG. 3 shows a perspective view of the supporting stand and connecting hook as utilized in the instant invention.

FIG. 4 shows a perspective fragmentary view of the reel drive hub and the slip ring attached to the drive shaft.

PREFERRED EMBODIMENT OF THE INVENTION

Referring now to the drawings and specifically FIG. 1, the device is shown attached to a conventional cable reel 20 and includes a square drive shaft 10 which has mounted slideably thereon a pair of reel-drive hubs 12 which engage the outer circumferential edges of the reel hub. Also mounted on shaft 10 are a pair of moveably adjustable slip rings 28 which receive a hook 18 utilized as part of the hanger assembly. Rigidly connected to hook 18 is a supporting stand 30 which is welded to the arcuate segment of the hook and includes a support base 32. The hook 18 is coupled to a flexible chain 14 by turnbuckles 16, the chain 14 being connected to an axle engaging hook 34 which is received about the axle of the reel 20. The axle 26 of the reel is supported on a conventional jack 22. The hooks 18 and 34, chain 14 and the turnbuckle 16 comprise one of two hanger assemblies which mount the drive shaft to the cable reel. The tie-down (used on each side of the reel)

includes a hook 36 and a chain 38 which connects to the jack 22. A portable electrical power unit (not shown) rotates drive shaft 10 causing the reel-drive hubs 12 frictionally coupled to the perimeter of the reel on each side to rotate in either direction, causing the entire reel to rotate for paying out or reeling in a cable. The support stand 30 (rigidly fixed to hook 18) and the tie-down 38 act to prevent the reel-drive hub 12 from moving upwardly or downwardly when the drive shaft is rotated.

Referring now to FIG. 2, the device is shown with the supporting stand 30 engaged to hook 18 which has been adjusted and tightened to connect the drive shaft to the axle of the reel 26. The electrical motor could be any conventional pipe threading power unit or electric mule with a universal drive bar. One man can operate the device using a hand-held portable electric motor. Portable motors for most manufactured portable type threading machines may also be used with a proper adaptor which fits the drive shaft and the motor drive.

FIG. 3 shows a supporting stand having a rigid vertical support 30 connected to a mounting base 32 which may be mounted on horizontal support 34 attached thereto. The rigid vertical support 30 is welded to the outside of hook 18 and acts to support the shaft 10 which is connected through the slip ring (FIG. 1) which is received into the hook 18.

FIG. 4 shows the drive shaft 10 having a slip ring 28 which includes a set screw 44 for longitudinally locking the slip ring 28 to the shaft after it has been adjustably moved along the longitudinal direction of the shaft to properly position it to receive the hanger assembly including hook 18. Likewise, the reel drive hub 12 includes a set screw 42 allowing it to be moved along the shaft 10 to the desired position and then locked in place by tightening the set screw. Since the shaft is square and the axial apertures in the slip ring 28 and the hub 12 are square, when the shaft rotates, the slip ring and the reel-drive hub 12 also rotate.

Referring back to FIG. 1, in operation, the shaft 10 is placed near the reel so that the reel-drive hubs 12 are positioned to frictionally contact the circumferential portion of the reel on each side. Next, the slide rings are positioned such that the hanger assembly will receive the hook and stand, with the hook 34 positioned about the axle of the reel. Turnbuckle 16 is then tightened to firmly mount the reel-drive hub 12 to the reel circumference on each side while the stand 30 and base are positioned on the ground. Finally, hook 36 and tie-down 38 (such as a chain) are hooked about the stand 30, firmly holding the entire unit and shaft in position. The power unit adaptor, if necessary, is placed on one end of the shaft and a portable electrical motor connected thereto. The shaft is tied down similarly on each side by tightening the turnbuckles. The reel-drive hubs are rubber covered of a friction engaging material such as neopreme rubber or the like to provide a positive friction connection between the exterior perimeter of the reel and the reel-drive unit without slippage.

When driving extremely heavy reels, two drive devices may be installed on opposite sides of the reel.

The unit is primarily designed for large cable reels which are driven individually. A plurality of smaller reels may be driven simultaneously. The unit is adapted to provide a pay out drive for cable reels having as large as five tons of cable on each reel. The unit in the preferred embodiment is shown primarily for use with the paying out of electrical cable, but may also be used for payout of steel cable and other various types of tubing which is shipped on steel or wooden reels.

The instant invention is shown and described herein in what is considered to be the most practical and preferred embodiment. It is recognized, however, that departures may be made therefrom within the scope of the invention and that obvious modifications will occur to a person skilled in the art.

What I claim is:

1. A portable cable reel drive for rotating a cable reel having a hub and mounted on an axle and an axle support comprising:
    a drive shaft;
    at least one reel drive hub connected to said drive shaft;
    a drive shaft hanger assembly rotatably coupled to said drive shaft at one end and coupleable to said cable reel axle;
    said drive shaft hanger assembly mounting said drive shaft in proximity to said reel hub for engaging said reel drive hub with said reel hub;
    a detachable drive shaft stabilizing means for securing said drive shaft in a fixed position relative to said reel and said stabilizing means connected to said drive shaft and said axle support; and
    means connected to said drive shaft for coupling said drive shaft to a mechanical rotational energy source;
    said drive shaft hanger assembly includes a first flexible connector, having an axle coupling means disposed at one end and a drive shaft coupling means disposed at the opposite end, said drive shaft coupling means being rotatably coupled to said drive shaft to permit rotation of said drive shaft and means for adjusting the length of said first flexible connector.

2. A portable cable reel drive as in claim 1, wherein:
    said drive shaft stabilizing means includes a base support, said base support being connected to said drive shaft coupling means, and a second flexible connector coupled between said cable reel axle support and said base support.

3. A portable cable reel drive as in claim 2, wherein:
    said reel drive hub is mounted on said drive shaft and lockably movable along the longitudinal axial direction of said drive shaft so that said reel drive hub may be positioned along said drive shaft.

* * * * *